United States Patent [19]
Green

[11] Patent Number: 5,951,671
[45] Date of Patent: Sep. 14, 1999

[54] SHARING INSTRUCTION PREDECODE INFORMATION IN A MULTIPROCESSOR SYSTEM

[75] Inventor: Thomas S. Green, Austin, Tex.

[73] Assignee: Advanced Micro Devices, Inc., Sunnyvale, Calif.

[21] Appl. No.: 08/993,475

[22] Filed: Dec. 18, 1997

[51] Int. Cl.⁶ .................................................. G06F 15/00
[52] U.S. Cl. .................................. 712/23; 712/28; 712/31
[58] Field of Search ...................... 395/800.23, 800.31, 395/800.32, 800.01; 712/23–28, 31, 32

[56] References Cited

U.S. PATENT DOCUMENTS

| | | | |
|---|---|---|---|
| 4,747,043 | 5/1988 | Rodman | 711/124 |
| 4,942,519 | 7/1990 | Nakayama | 395/290 |
| 5,214,769 | 5/1993 | Uchida et al. | 711/151 |
| 5,265,004 | 11/1993 | Schultz et al. | 364/140.05 |
| 5,748,978 | 5/1998 | Narayan et al. | 395/800.23 |
| 5,751,981 | 5/1998 | Witt et al. | 395/380 |
| 5,752,264 | 5/1998 | Blake et al. | 711/144 |
| 5,819,067 | 10/1998 | Lynch | 395/500 |

*Primary Examiner*—Meng-Ai T. An
*Assistant Examiner*—Mackly Monestime
*Attorney, Agent, or Firm*—Conley, Rose & Tayon, PC; B. Noel Kivlin

[57] ABSTRACT

A multiprocessor system capable of sharing instruction predecode information is disclosed. By storing predecode information as it is calculated, and then allowing other processors in the system to access the information, subsequent prefetches of instructions are made without repeating predecode calculations. The multiprocessor system may comprise a bus connecting at least two microprocessors together. The microprocessors may be configured to generate predecode information for a plurality of instructions and then share the predecode information with other microprocessors coupled to the bus. The predecode information may be stored in a single storage location or in multiple locations, and the information may be stored internally within the microprocessors or externally. The microprocessors in the system may be configured to search for predecode information corresponding to instructions being accessed. The predecode information may comprise start and end bits, functional bits, valid masks, or other data related to alignment and decode of instructions. A method for sharing predecode information among a plurality of processors is also disclosed. The method comprises loading a set of instruction bytes into a microprocessor and generating predecode information. The predecode information is then stored. The predecode information may be used the next time the set of instruction bytes is accessed by another microprocessor in the system.

19 Claims, 6 Drawing Sheets

FIG. 8

SHARING INSTRUCTION PREDECODE INFORMATION IN A MULTIPROCESSOR SYSTEM

BACKGROUND OF THE INVENTION

1. Field of the Invention

This invention relates to microprocessors and more particularly, to determining the length of variable length microprocessor instructions.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

Figure 1:
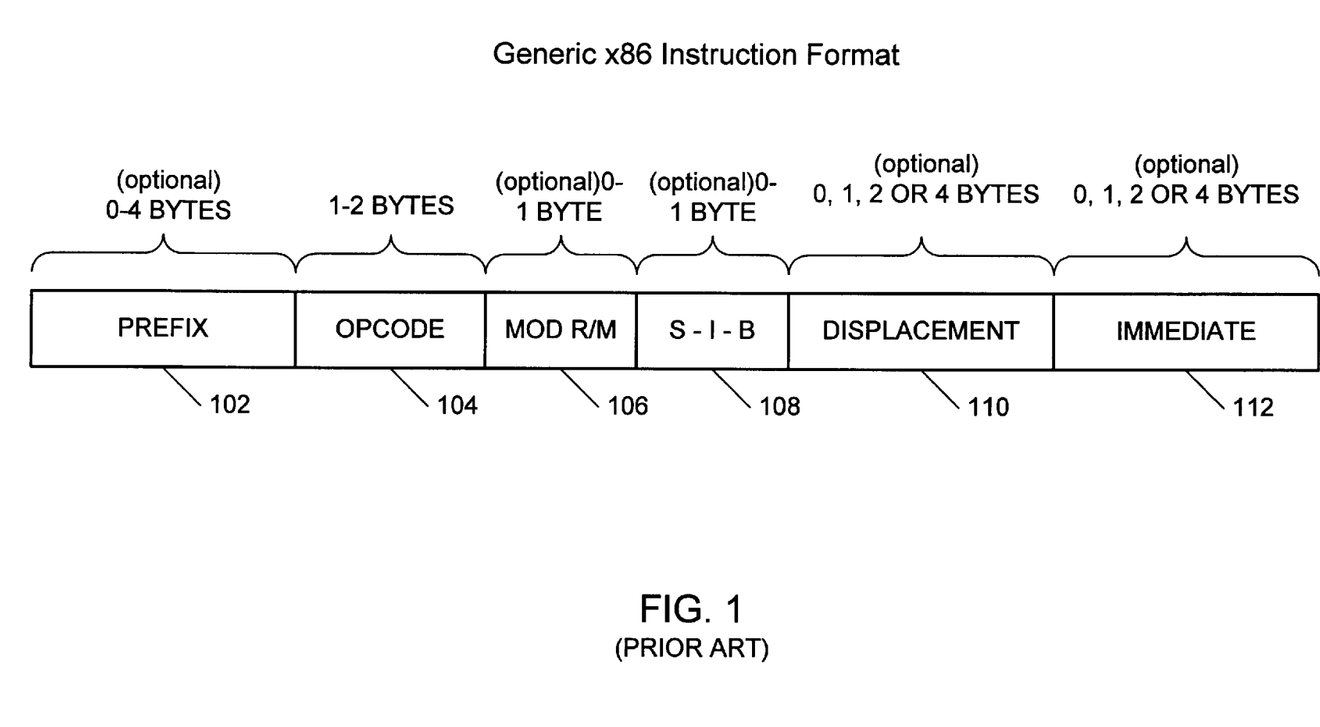
FIG. 1 is a block diagram of a generic x86 instruction format.

The x86 instruction set is relatively complex and is characterized by a plurality of variable byte length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86 compatible superscalar microprocessors. In particular, the variable length of x86 instructions requires that instructions be predecoded to determine where each instruction starts and ends. Predecode occurs when an instruction is prefetched (i.e., read from memory and stored into the instruction cache) and typically involves the use of an instruction scanning mechanism to generate start and end bits for each instruction byte. When an instruction is fetched from the instruction cache, the start and end bits are used to generate a valid mask. A valid mask is a series of bits in which each consecutive bit corresponds to a particular byte of instruction information. For a particular instruction fetch, the valid mask bits associated with the first byte of the instruction, the last byte of the instruction, and all bytes in between the first and last bytes of the instruction are asserted. All other bits in the valid mask are not asserted. For example, given the following 8-byte instruction cache line, the following valid mask would be generated for a fetch of instruction B:

| | byte → | 0 | 1 | 2 | 3 | 4 | 5 | 6 | 7 |
|---|---|---|---|---|---|---|---|---|---|
| cache line | | A | A | B | B | B | B | C | C |
| | bit → | 0 | 1 | 2 | 3 | 4 | 5 | 6 | 7 |
| end bit information | | 0 | 1 | 0 | 0 | 0 | 1 | 0 | 0 |
| start bits | | 0 | 0 | 1 | 0 | 0 | 0 | 1 | 0 |
| valid mask | | 0 | 0 | 1 | 1 | 1 | 1 | 0 | 0 |

Once a valid mask is calculated for a particular instruction fetch, it may then be used to mask off the unwanted bytes that are not part of the particular instruction. In the example above, the valid mask for the fetch of instruction B could be used to mask off the unwanted end bytes of instruction A and the unwanted beginning bytes of instruction C.

Unfortunately, the process of calculating start and end bits for variable length instructions is complicated and typically requires a number of cascaded levels of logic to perform. Thus it is difficult to calculate start and end bits for more than one instruction per clock cycle. This may limit the overall performance of the microprocessor. For these reasons, a fast method for determining start and end bits for variable length instructions is desired.

SUMMARY OF THE INVENTION

The problems outlined above are in large part solved by a multiprocessor system capable of sharing instruction predecode information. By storing predecode information as it is calculated and then allowing other processors to access the information, subsequent prefetches may be made without repeating the time consuming predecode calculations. Advantageously, this may speed instruction prefetch and increase the number of instructions prefetched in a clock cycle.

In one embodiment, the multiprocessor system comprises a bus connecting at least two microprocessors together. The microprocessors may each be configured to generate predecode information for a plurality of instructions and then share the predecode information with other microprocessors coupled to the bus. The multiprocessor system may further comprise a predecode information storage unit (PISU) that is external to the microprocessors and coupled between them by the bus. The PISU may be configured to receive and store the predecode information, while the microprocessors may be configured to search the PISU for predecode information corresponding to the instructions being accessed. Advantageously, once the predecode information for a particular set of instruction bytes has been calculated, it may stored in the PISU for later use by other microprocessors.

The PISU may comprise a portion of a level two cache or of main system memory. The multiprocessor system may be configured to vary the amount of memory allocated to the PISU in relation to the amount of free memory available. In another embodiment, each microprocessor may have its own internal PISU. Each microprocessor coupled to the bus may then be configured to ensure that duplicate copies of predecode information are not stored in the internal PISUs. The predecode information may comprise start and end bits, functional bits, valid masks, or other combinations of data related to alignment and decode of instructions.

A method for sharing predecode information among a plurality of processors is also contemplated. In one embodiment, the method comprises loading a plurality of instruction bytes into a microprocessor and generating predecode information. The predecode information is then stored in a storage location. The predecode information is then read from the storage location the next time the instruction bytes are accessed by another microprocessor.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will be described in detail herein. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
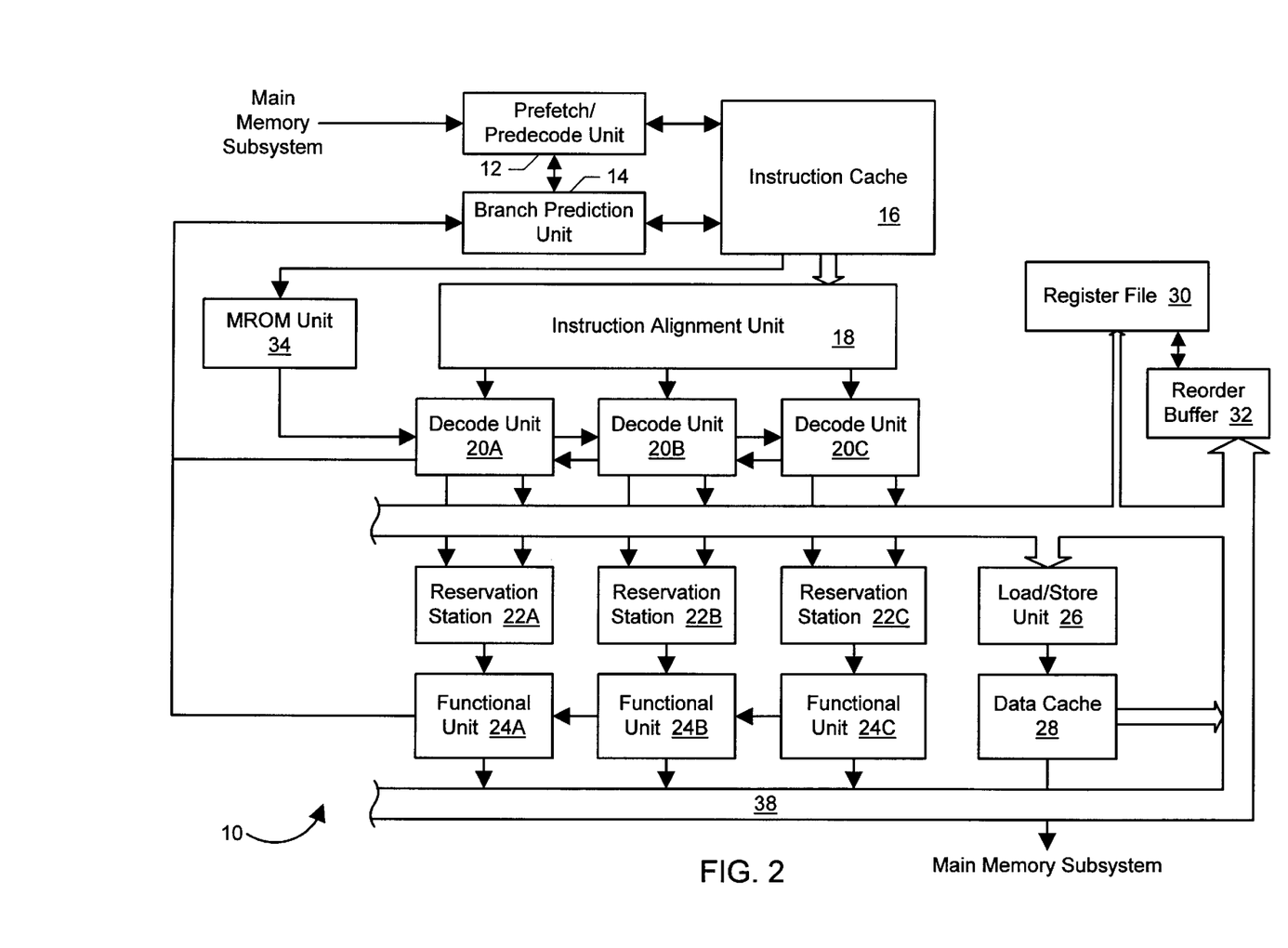
FIG. 2 is a block diagram of one embodiment of a superscalar microprocessor.

Turning now to FIG. 2, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache 16. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are prefetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates a number of predecode bits for each byte of the instructions, e.g., a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34. Still further, prefetch/predecode unit 12 may be configured to detect branch instructions and to store branch prediction information corresponding to the branch instructions into branch prediction unit 14.

One possible encoding of the predecode tags for microprocessor 10 is described below. In the exemplary encoding, if a particular byte is the first byte of an instruction, the start bit for that byte is set. Similarly, if the byte is the last byte of an instruction, the end bit for that byte is set. The third exemplary predecode bit is the functional bit, which distinguishes instructions which may be directly decoded by decode units 20, i.e., "fast path" instructions, and the remaining x86 instructions, i.e., MROM instructions. For fast path instructions, the functional bit may be set for each prefix byte included in the instruction, and cleared for other bytes. Alternatively, for MROM instructions the functional bit may be cleared for each prefix byte and set for other bytes. Thus, the type of instruction may be easily determined by examining the functional bit corresponding to the end byte. If that functional bit is clear, the instruction is a fast path instruction. Conversely, if that functional bit is set, the instruction is an MROM instruction. The opcode of an instruction may thereby be located in a fast past instruction as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and translates the MROM instruction into a subset of defined fast path instructions to effectuate the desired operation. MROM unit 34 dispatches the subset of fast path instructions to decode units 20.

Before proceeding with a detailed description of the multiprocessor system configured to share predecode information, general aspects regarding exemplary superscalar microprocessor 10 of FIG. 2 will be described.

Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the predecode data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data)

for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 3:
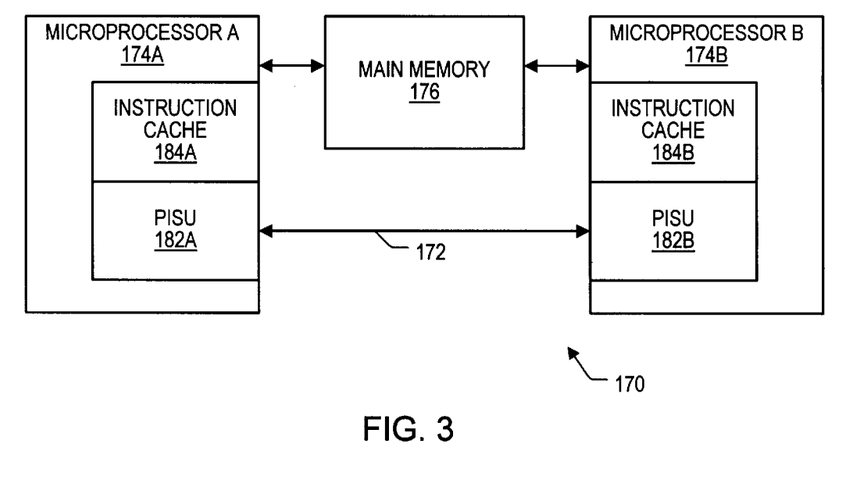
FIG. 3 is a block diagram of one embodiment of a multiprocessor system configured to share predecode information.

Turning now to FIG. 3, one embodiment of a multiprocessor system configured to share predecode information is shown. Multiprocessor system 170 comprises bus 172 and microprocessors 174A and 174B. Bus 172 couples microprocessors 174A and 174B together. Microprocessors 174A and 174B may be configured similarly to microprocessor 10 disclosed above, e.g., instruction caches 184A and 184B may be configured similarly to instruction cache 16. However, microprocessors 174A and 174B each further comprise a predecode information storage unit (PISU), 182A and 182B respectively. PISUs 182A and 182B each comprise a plurality of storage locations for storing predecode information associated with a particular set of instruction bytes.

The operation of PISUs 182A and 182B will be explained by example. When instruction bytes are prefetched for the first time from main memory 176 by microprocessor 174B, its predecode unit generates predecode tags as explained above. The tags are then stored in PISU 182B along with the corresponding prefetch address. When performing a prefetch, microprocessor 174B is configured to search PISU 182B for predecode information. If there is a match between the current prefetch address and a prefetch address previously stored in PISU 182B, then the requested instruction bytes have already been predecoded. Thus, the desired predecode information may simply be read from PISU 182B. Each microprocessor coupled to bus 172 may be similarly configured. Advantageously, this may eliminate the delay associated with predecode information calculation for subsequent instruction accesses.

If the predecode information is not stored in PISU 182B when microprocessor 174B performs the prefetch, the prefetch address is sent to other microprocessors via bus 172. Alternatively, the prefetch address may be sent concurrently with the search of PISU 182B. The other microprocessors coupled to bus 172 receive the prefetch address and search their PISUs in a similar fashion. If a matching address is found, the corresponding predecode information is sent to microprocessor 174B through bus 172. Advantageously, if one microprocessor has calculated predecode information for a particular set of instruction bytes, all microprocessors coupled to bus 172 will have access to the predecode information.

In some instances, the stored predecode information may be incorrect. For example, if the instructions being fetched have been modified, i.e., self-modifying code, or if the middle of an instruction is prefetched, i.e., a jump to the middle of an instruction, then the predecode information for the affected instruction bytes may change. However, self-modifying code and jumps to the middle of an instruction occur relatively infrequently and thus should not greatly effect the performance gain that may be created by storing and sharing previously calculated predecode information. In the event the predecode information is incorrect, decode units in the microprocessor (e.g., decode units 20A–20C in microprocessor 10) may be configured to detect the incorrect information and cause the predecode information to be recalculated. Microprocessors 174A and 174B may be configured to clear the old predecode information upon detecting a recalculation. Furthermore, microprocessors 174A and 174B may be configured to send the prefetch address having the incorrect predecode data to other microprocessors via bus 172. The prefetch address may be accompanied with a clear signal indicating that any stored predecode information associated with the prefetch address should be discarded. Once the predecode information is recalculated by prefetch/predecode unit 12 (see FIG. 1), the information may then be stored by within the PISU of the microprocessor that calculated it.

In one embodiment, microprocessors 174A and 174B are configured to store predecode information within their PISUs only after determining that no other microprocessors connected to bus 172 are storing predecode information for a corresponding prefetch address. Advantageously, this may allow PISUs to use less die space because duplicate copies of the same predecode information are not being stored. If a PISU becomes full, a variety of replacement schemes may be used to replace the old data with new data. For example, data associated with the oldest prefetch address may be overwritten first.

Note that while FIG. 3 illustrates a system having only two microprocessors, systems using more microprocessors are possible. Furthermore, bus 172 may comprises a number of signal lines, buffers, transceivers, and other bus interface logic as necessary for supporting communication between the microprocessors coupled to bus 172.

Figure 4:
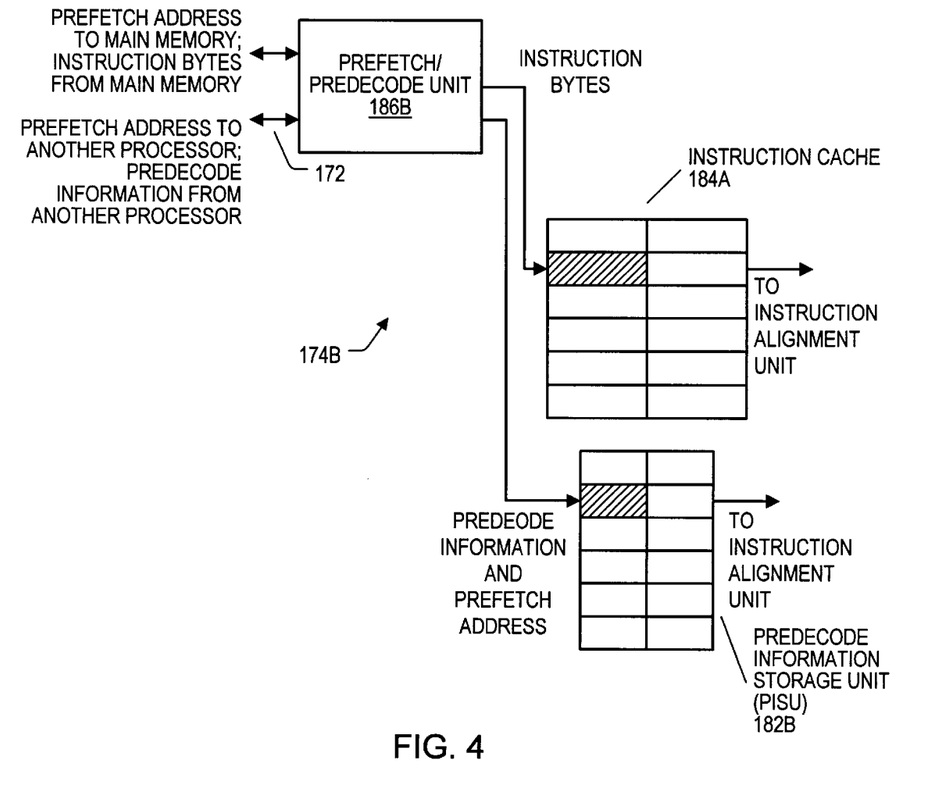
FIG. 4 is a block diagram showing more detail of the multiprocessor system of FIG. 3.

Turning now to FIG. 4, more detail is shown of one embodiment of microprocessor 174B. Microprocessor 174B comprises PISU 182B, instruction cache 184B, and prefetch/predecode unit 186B. Prefetch/predecode unit 186B is coupled to PISU 182B, instruction cache 184B, and bus 172. Upon receiving a prefetch address, prefetch/predecode unit 186B reads the requested instruction bytes from main memory 176. Prefetch/predecode unit 186B also searches PISU 182B for predecode information corresponding to the prefetch address. If none is found, prefetch/predecode unit 186B is configured to send the prefetch address to other microprocessors via bus 172. As previously noted, this may also be performed in parallel with the search of PISU 182B. If a PISU within another microprocessor is storing the desired predecode information, prefetch/predecode unit 186B will receive the information on bus 172 and then store it (along with the prefetch address) into PISU 182B. The microprocessor sending the predecode information to prefetch/predecode unit 186B may be configured to deallocate the storage location storing the sent information, as a copy is now stored in PISU 182B.

In contrast, if none of the microprocessors coupled to bus 172 are storing the requested predecode information, prefetch/predecode unit 186B may be configured to calculate the information when the requested instruction bytes are received from main memory. The calculated information and prefetch address may then be stored in PISU 182B. When microprocessor 174B reads an instruction from instruction cache 184B, the corresponding predecode information is also read from PISU 182B. The predecode information is used by microprocessor 174B's instruction alignment unit (see FIG. 1) to generate a valid mask.

Note that in some embodiments, only part of the prefetch address may be stored in PISU 182B. Furthermore, depending upon the addressing system used to access instruction cache 184B, e.g., linear addressing or physical addressing, portions of either the physical or linear address may be used to access PISU 182B. In yet another embodiment, addresses are not stored in PISU 182B. Instead, each storage location within PISU 182B corresponds to a particular address or address portion, thereby eliminating the need to explicitly store addresses.

Figure 5:
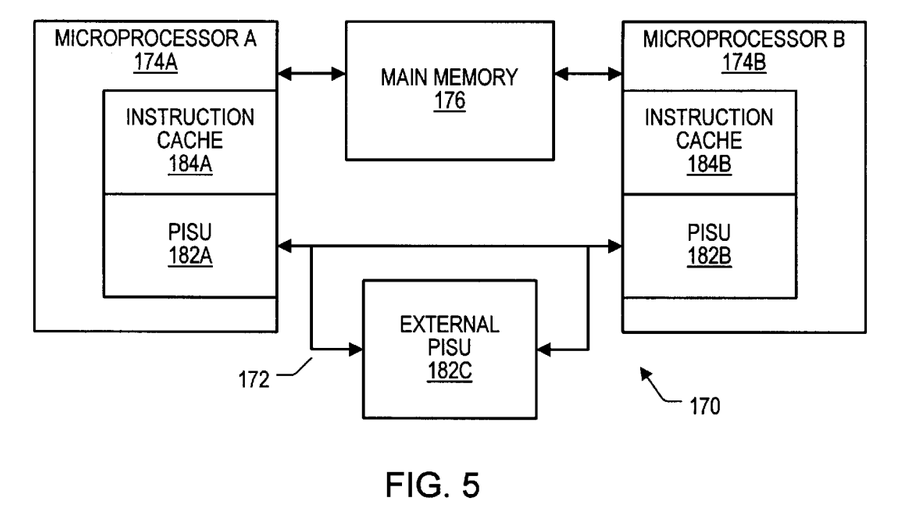
FIG. 5 is a block diagram of another embodiment of the multiprocessor system of FIG. 3.

Turning now to FIG. 5, another embodiment of multiprocessor system 170 is shown. In this embodiment, multiprocessor system 170 comprises microprocessors 174A and 174B, main memory 176, and external predecode information storage unit (PISU) 182C. External PISU 182C is coupled to microprocessors 174A and 174B via bus 172. External PISU 182C is configured to store predecode information in a manner similar to PISUs 182A and 182B. External PISU 182C may be located off-chip from microprocessors 174A and 174B. Advantageously, external PISU 182C may be larger and store more information than internal PISUs 182A and 182B because external PISU 182C will not be subject to the die space constrains present within microprocessors 174A and 174B.

In one embodiment, external PISU 182C may be used in lieu of PISUs 182A and 182B. Each microprocessor on bus 172 may be configured to request predecode information from external PISU 182C as needed. If the information is not stored in external PISU 182C, the predecode information is calculated and then forwarded to external PISU 182C for storage. In this embodiment, bus 172 may couple each microprocessor directly to PISU 182C.

In another embodiment, external PISU 182C may be configured to operate in conjunction with PISUs 182A and 182B. For example, PISUs 182A and 182B may be configured to store predecode information corresponding to instruction bytes stored within instruction caches 184A and 184B, respectively. External PISU 182C may be configured to receive and store predecode information for instruction bytes which are overwritten in instruction cache 184A. Furthermore, bus 172 may be configured to couple microprocessors 174A and 174B to each other as well as to external PISU 182C. Note that other configurations for spreading predecode information among PISUs 182A, 182B, and 182C are also possible.

In yet another embodiment, external PISU 182C may be configured to monitor memory accesses (e.g., to a level two cache or to main memory 178) performed by microprocessors 174A and 174B. If external PISU 182C detects an address for which it is storing predecode information, external PISU 182C may forward the corresponding predecode information without waiting for a request from the microprocessor. Advantageously, this may reduce the time required for accessing the information stored in external PISU 182C. If the information is not needed (e.g., it is already stored within the microprocessor), the microprocessor may simply ignore it.

Similarly, microprocessors 174A and 174B may also be configured to monitor each other's memory accesses. For example, if microprocessor 174A detects a memory access by microprocessor 174B to a memory address for which PISU 182A is storing predecode information, microprocessor 174A may be configured to automatically forward the stored predecode information to microprocessor 174B without waiting for a request from microprocessor 174B. Advantageously, this configuration may reduce the time required to access predecode information stored within another microprocessor. If the stored information is not needed, microprocessor 174B may simply ignore it.

In another embodiment, microprocessors 174A and 174B may be configured to broadcast predecode information on bus 172 as the predecode information is generated. PISU 182C may then save the information for future use by the same or other microprocessors. Furthermore, any other microprocessors coupled to bus 172 may elect to store the information as it is broadcast (e.g., if the microprocessor is about to prefetch that address). While multiple copies of the same information may be stored in this embodiment, the information may be more readily available with shorter access times.

Figure 6:
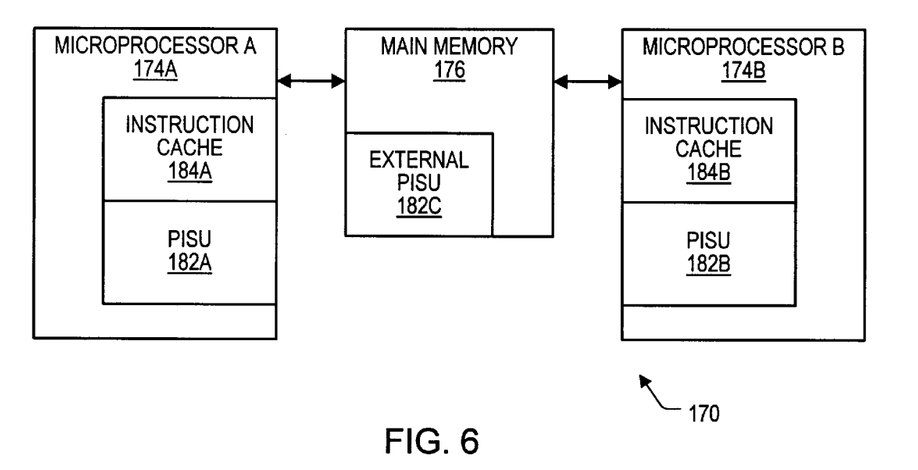
FIG. 6 is a block diagram showing yet another embodiment of the multiprocessor system of FIG. 3.

Turning now to FIG. 6, another embodiment of multiprocessor system 170 is shown. In this embodiment, external PISU 182C is configured to be part of main memory 176. Advantageously, this configuration may not require an additional integrated circuit for external PISU 182C. Instead, external PISU 182C may simply use part of main memory 176. Furthermore, the amount of main memory 176 allocated to external PISU 182C may be varied according to the amount of free memory available within main memory 176. This configuration may be used with or without internal PISUs 182A and 182B.

Figure 7:
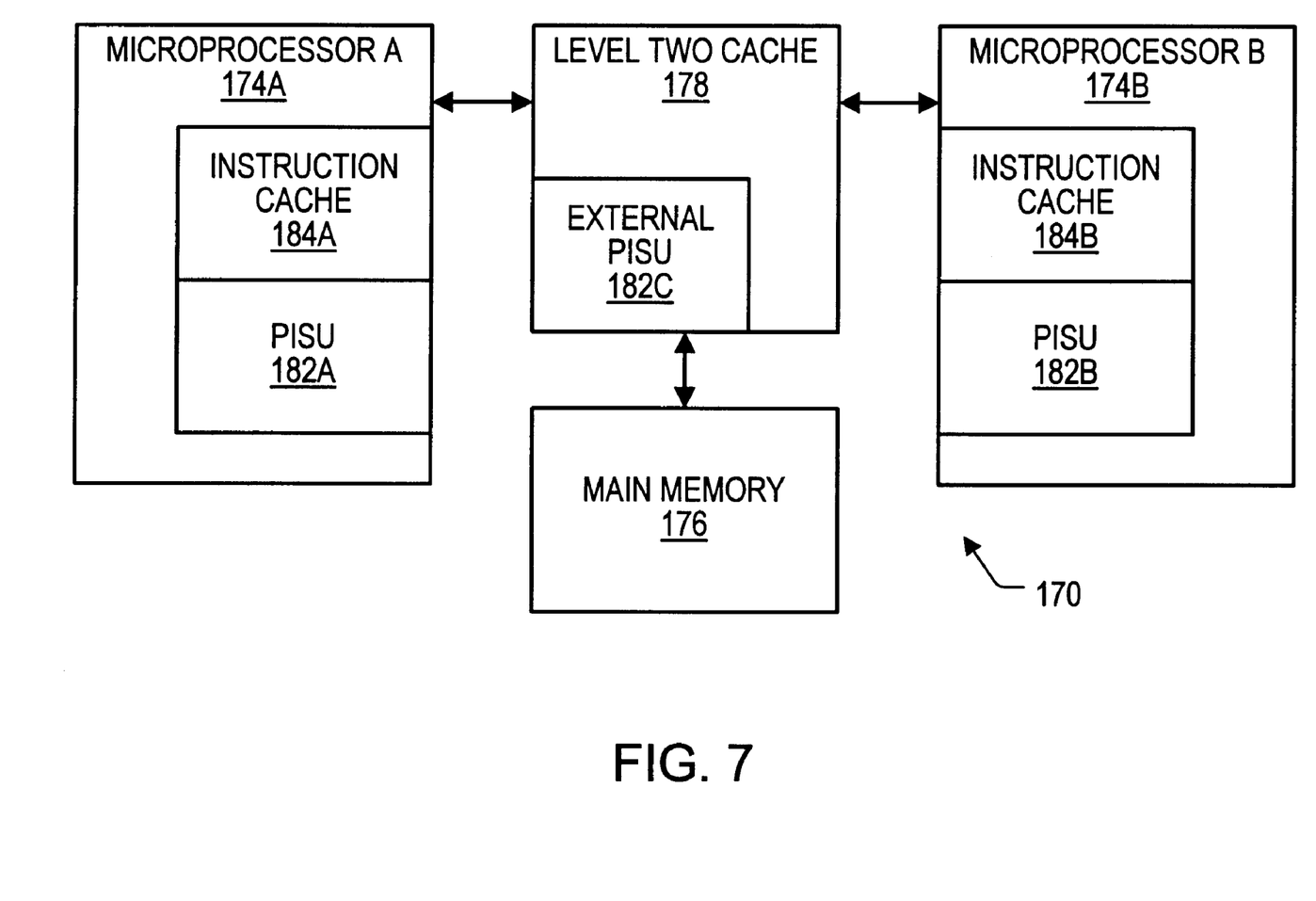
FIG. 7 is a block diagram showing still another embodiment of the multiprocessor system of FIG. 3.

Turning now to FIG. 7, yet another embodiment of multiprocessor system 170 is shown. In this embodiment, external PISU 182C is configured as part of level two cache 178. Level two cache 178 is a cache that is external to microprocessors 174A and 174B and capable of faster access times than main memory 176. As in the previously disclosed embodiments, the portion of level two cache 178 allocated to external PISU 182C may be fixed or varied. Advantageously, this embodiment may not require an additional dedicated integrated circuit for external PISU 182C and yet may still provide predecode information faster than if the information were stored in main memory 176.

In another embodiment, microprocessors 174A and 174B may be configured to automatically load the predecode information (if it is available) whenever an instruction is loaded from level two cache 178 or main memory 176. The information may be stored in main memory 176, in level two cache 178, or within another microprocessor. Advantageously, this configuration may further improve predecode information access times.

Note that combinations of the above embodiments are also contemplated. For example, one configuration of multiprocessor system 170 may comprise microprocessor-internal PISUs 182A and 182B, an external PISU within level two cache 178, and an external PISU within main memory 176. In some embodiments, the size of each individual PISU may be adjusted as necessary. Further note that the predecode information stored may differ. For example, in one embodiment only start bits may be stored. In another embodiment, other information such as functional bits or valid masks may be stored instead of (or in combination with) start and end bits.

Figure 8:
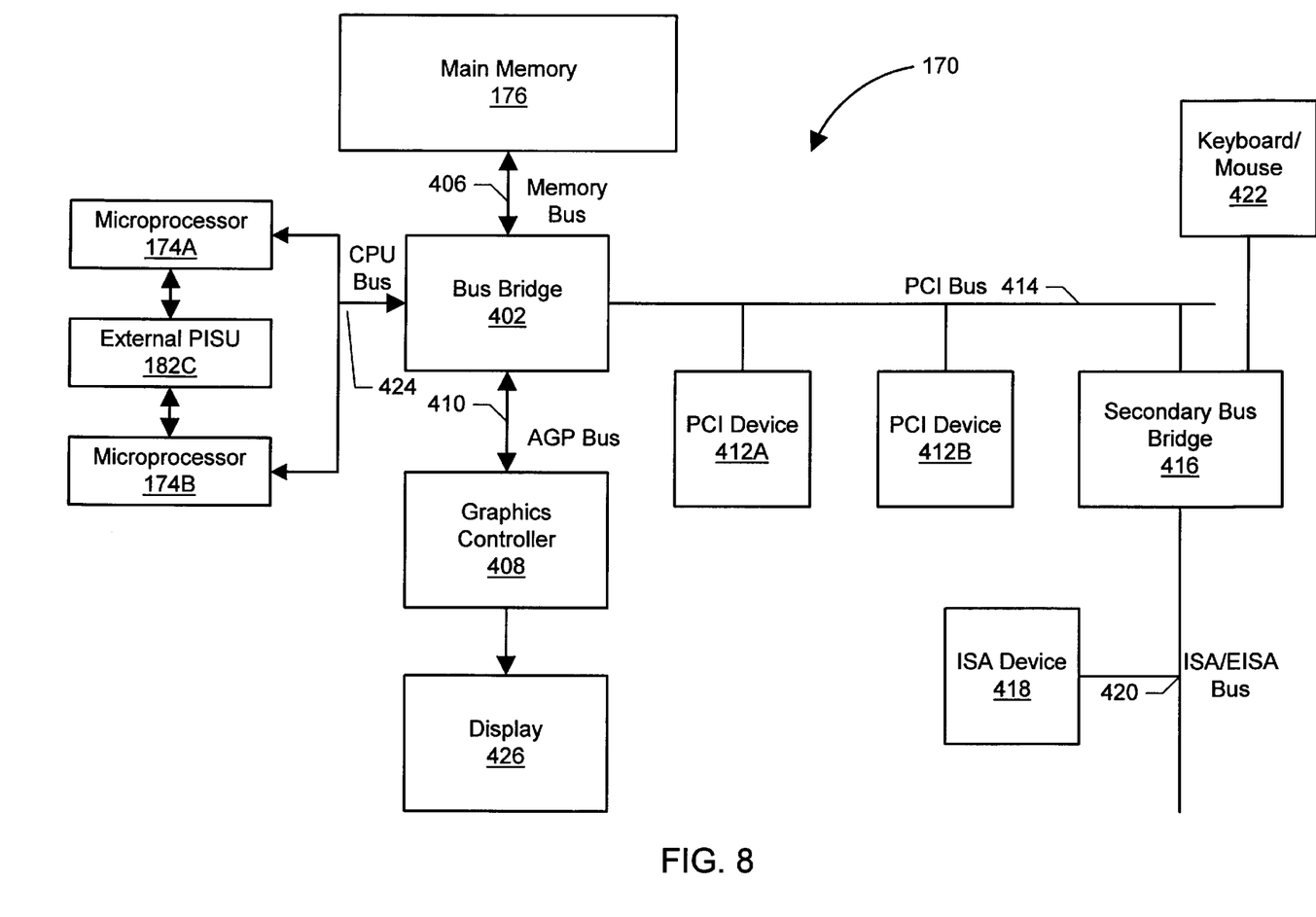
FIG. 8 is a diagram showing several other components that may be included in the multiprocessor system.

Turning now to FIG. 8, several other components that may be included in multiprocessor system 170 are shown. In one embodiment, microprocessors 174A and 174B are coupled to a variety of system components through a bus bridge 402. Other embodiments are possible and contemplated. In the depicted system, a main memory 176 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessors 174A and 174B are coupled to bus bridge 402 through a CPU bus 424.

Bus bridge 402 provides an interface between microprocessors 174A and 174B, main memory 176, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 170 to provide operational support for a keyboard and mouse 422 and for various serial and parallel ports, as desired. An external cache unit (not shown) may further be coupled to CPU bus 424 between microprocessors 174A and 174B and bus bridge 402 in other embodiments. Alternatively, the external cache may be coupled to bus bridge 402 and cache control logic for the external cache may be integrated into bus bridge 402.

Main memory 176 is a memory in which application programs are stored and from which microprocessors 174A and 174B primarily execute. A suitable main memory 176 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 176. Graphics controller 408 may therefore be a master of AGP bus 410 in that it can request and receive access to a target interface within bus bridge 402 to thereby obtain access to main memory 176. A dedicated graphics bus accommodates rapid retrieval of data from main memory 176. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc. It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A multiprocessor system configured to share predecode information comprising:
   a first microprocessor configured to read a plurality of instruction bytes from a memory, wherein said first microprocessor is configured to generate predecode information corresponding to said plurality of instruction bytes, wherein said first microprocessor is configured to store said predecode information into a storage location, wherein said predecode information is usable to decode said instruction bytes;
   a second microprocessor configured to read said plurality of instruction bytes from said memory at a later time, wherein said second microprocessor is configured to read said predecode information generated by said first microprocessor from said storage location; and
   a bus connecting said first microprocessor to said second microprocessor, wherein said first microprocessor and said second microprocessor are configured to share said predecode information over said bus.

2. The multiprocessor system as recited in claim 1 wherein said storage location is a predecode information storage unit external to said first and second microprocessors, wherein said storage unit is coupled between said first microprocessor and said second microprocessor on said bus, wherein said storage unit is configured to receive and store said predecode information, and wherein said first and second microprocessors are configured to search said stored predecode information for information corresponding to instruction bytes being prefetched.

3. The multiprocessor system as recited in claim 2, further comprising a level two cache coupled to said first microprocessor and said second microprocessor, wherein said storage unit comprises a portion of said level two cache, and wherein said level two cache is configured to store other information in addition to said stored predecode information.

4. The multiprocessor as recited in claim 3, wherein the amount of storage within said level two cache that is allocated to said storage unit varies according to the amount of free memory in said level two cache.

5. The multiprocessor system as recited in claim 2, further comprising a main system memory coupled to said first and second microprocessors, wherein said storage unit comprises a portion of said main system memory, and wherein said main system memory is configured to store other information in addition to said stored predecode information.

6. The multiprocessor system as recited in claim 5, wherein the amount of main system memory allocated to said storage unit varies according to amount of free memory in said main system memory.

7. The multiprocessor system as recited in claim 1, wherein said first microprocessor and said second microprocessor each have an internal predecode storage unit configured to store said instruction predecode information.

8. The multiprocessor system as recited in claim 7, wherein said first microprocessor and said second microprocessor communicate using said bus to ensure that duplicate copies of said predecode information are not stored in said internal storage units.

9. The multiprocessor system as recited in claim 2, wherein said predecode information comprises start and end bits indicative of the first and last bytes, respectively, of instructions within said plurality of instructions.

10. The multiprocessor system as recited in claim 2 wherein said predecode information comprises bits indicating whether the associated instruction byte is an opcode byte.

11. The multiprocessor system as recited in claim 2 wherein said predecode information comprises valid masks associated with particular instructions.

12. The multiprocessor system as recited in claim 1 further comprising a predecode information storage unit external to said first and second microprocessors, wherein said storage unit is coupled between said first and second microprocessors on said bus, wherein said storage unit is configured to receive and store said predecode information, wherein said first and second microprocessors each comprise an internal predecode storage unit configured to store said instruction predecode information, and wherein said first and second microprocessors are configured to access said internal predecode storage units to search for stored predecode information corresponding to instruction bytes being prefetched.

13. The multiprocessor system as recited in claim 12, wherein said first and second microprocessors are configured to search said external storage unit if said internal storage units do not store the desired predecode information.

14. A method for sharing predecode information among a plurality of microprocessors comprising:
   loading a plurality of instruction bytes into a first microprocessor from a memory;
   generating predecode information for said plurality of instruction bytes within said first microprocessor;
   storing said predecode information into a storage location, wherein said storage location corresponds to said plurality of instruction bytes; and
   conveying said predecode information from said storage location to a second microprocessor in response to said second microprocessor loading instructions corresponding to said storage location from said memory.

15. The method as recited in claim 14, wherein said storage location comprises a predecode information storage unit located outside said first and second microprocessors.

16. The method as recited in claim 15, wherein said storage unit comprises a portion of a level two cache.

17. The method as recited in claim 15, wherein said storage unit comprises a portion of said memory.

18. The method as recited in claim 14, wherein said storage location comprises a first predecode information storage unit within said first microprocessor and a second predecode information storage unit within said second microprocessor.

19. The method as recited in claim 18, further comprising communicating between said first and second microprocessors in order to ensure that duplicate copies of predecode information are not stored in said first and second predecode information storage units.

* * * * *